US012546956B2

(12) United States Patent
Hirose

(10) Patent No.: US 12,546,956 B2
(45) Date of Patent: Feb. 10, 2026

(54) MANUFACTURING TOOL FOR OPTICAL CONNECTOR

(71) Applicant: Fujikura Ltd., Tokyo (JP)

(72) Inventor: Masayuki Hirose, Sakura (JP)

(73) Assignee: Fujikura Ltd., Tokyo (JP)

( * ) Notice: Subject to any disclaimer, the term of this patent is extended or adjusted under 35 U.S.C. 154(b) by 323 days.

(21) Appl. No.: 18/259,443

(22) PCT Filed: Oct. 18, 2021

(86) PCT No.: PCT/JP2021/038445
§ 371 (c)(1),
(2) Date: Jun. 27, 2023

(87) PCT Pub. No.: WO2022/219834
PCT Pub. Date: Oct. 20, 2022

(65) Prior Publication Data
US 2024/0061191 A1 Feb. 22, 2024

(30) Foreign Application Priority Data
Apr. 16, 2021 (JP) .................................. 2021-069662

(51) Int. Cl.
*B25C 11/00* (2006.01)
*G02B 6/38* (2006.01)

(52) U.S. Cl.
CPC .................................. *G02B 6/3898* (2013.01)

(58) Field of Classification Search
CPC .............................. B25C 11/00; G02B 6/3898
See application file for complete search history.

(56) References Cited

U.S. PATENT DOCUMENTS

| 1,344,628 A | * | 6/1920 | Fortin | ..................... E01B 29/26 254/18 |
| 5,094,097 A | * | 3/1992 | Tooth | ................... H01R 43/042 81/313 |
| 5,392,508 A | * | 2/1995 | Holliday | .............. H01R 43/042 29/280 |

(Continued)

FOREIGN PATENT DOCUMENTS

| CN | 205703816 U | 11/2016 |
| JP | H06-501562 A | 2/1994 |

(Continued)

OTHER PUBLICATIONS

International Search Report issued in corresponding International Application No. PCT/JP2021/038445 mailed Dec. 7, 2021 (3 pages).

*Primary Examiner* — Lee D Wilson
(74) *Attorney, Agent, or Firm* — Osha Bergman Watanabe & Burton LLP

(57) ABSTRACT

A manufacturing tool for an optical connector includes: a tool body that includes a concave part; a handle that includes an operating part and a contact part; and a connecting shaft that rotatably connects the handle to the tool body. The handle is rotatable between: a stand-by position, and a push-into position in which a larger portion of the contact part is disposed inside the concave part than in the stand-by position. A direction in which the operating part moves is different from a direction in which the contact part moves.

4 Claims, 13 Drawing Sheets

(56) References Cited

U.S. PATENT DOCUMENTS

| | | | | |
|---|---|---|---|---|
| 5,743,131 | A | * | 4/1998 | Holliday ............... B25B 27/146 72/409.13 |
| 2001/0006001 | A1 | | 7/2001 | Battenfeld |
| 2005/0210668 | A1 | | 9/2005 | Palmer et al. |
| 2024/0061191 | A1 | * | 2/2024 | Hirose ................. G02B 6/3898 |

FOREIGN PATENT DOCUMENTS

| | | | |
|---|---|---|---|
| JP | 2001-166180 | A | 6/2001 |
| JP | 2006-227575 | A | 8/2006 |
| JP | 2009-512897 | A | 3/2009 |
| JP | 2009-115864 | A | 5/2009 |
| JP | 2020-170135 | A | 10/2020 |

* cited by examiner

MANUFACTURING TOOL FOR OPTICAL CONNECTOR

CROSS-REFERENCE TO RELATED APPLICATIONS

This application claims priority to Japanese Patent Application No. 2021-069662, filed Apr. 16, 2021, the entire content of which is incorporated herein by reference.

TECHNICAL FIELD

The present invention relates to a manufacturing tool for an optical connector.

BACKGROUND

Patent Document 1 discloses an optical connector that includes a ferrule through which an optical fiber is inserted, a spring that biases the ferrule, a spring push that supports the spring, and a housing that accommodates the ferrule and the spring push. The spring push has two locking claws that lock against the housing from the inside.

PATENT LITERATURE

[Patent Document 1]
Japanese Unexamined Patent Application, First Publication No. 2020-170135

When manufacturing such an optical connector, a step of pushing the spring push into the housing against the force of the spring while tilting the locking claws toward the inside of the housing is performed. Here, when manufacturing the optical connector, the spring push may not be pushed into the housing to an appropriate position. In particular, when the biasing force of the ferrule due to the spring is large, the pushing of the spring push into the housing may be insufficient due to the magnitude of this biasing force. When the spring push is not properly pushed into the housing, the work is to be redone and the manufacturing efficiency of the optical connector is reduced.

SUMMARY

One or more embodiments of the present invention provide a manufacturing tool for an optical connector capable of improving the manufacturing efficiency of optical connectors.

A manufacturing tool for an optical connector according to one or more embodiments of the present invention includes a tool body in which a concave part is formed; a handle having an operating part and a contact part; a connecting shaft configured to rotatably connect the handle to the tool body, in which the handle is rotatable between a stand-by position and a push-into position in which a position of the contact part is located more so on an inside of the concave part than a position of the contact part at the stand-by position, and when the handle moves between the stand-by position and the push-into position, a direction in which the operating part moves and a direction in which the contact part moves are different with each other.

According to the above embodiments, by setting the housing or the like of the optical connector inside the concave part and operating the operating part, it is possible to have the contact part projected inside the concave part. By pushing the housing with the contact part, the spring push can be locked to the housing. By using the manufacturing tool in this manner, the spring push can be easily pushed into the housing, and it is possible to improve manufacturing efficiency. Further, since the direction in which the operating part moves and the direction in which the contact part moves are different with each other, it is possible to make the manufacturing tool compact even in a structure that uses the principle of leverage to amplify the operation force and obtain the pushing force.

Here, the manufacturing tool for an optical connector according to the above embodiments further includes a ratchet mechanism that restricts movement of the handle toward the stand-by position when the handle is positioned between the stand-by position and the push-into position; and a handle biasing member that biases the handle toward the stand-by position, in which the ratchet mechanism includes: a first engaging part fixed to the handle; a second engaging part rotatable about a ratchet shaft provided on the tool body; and a ratchet biasing member that biases the second engaging part.

The tool body includes: a connector set part in which the concave part is formed; a base part to which the operating part approaches when the handle moves from the stand-by position to the push-into position; and a pair of support parts located between the connector set part and the base part and supporting the connecting shaft.

Further, a projecting part projecting toward the contact part may be formed on the inner surface of the concave part.

According to the present invention, it is possible to provide a manufacturing tool for an optical connector capable of improving the manufacturing efficiency of optical connectors.

DETAILED DESCRIPTION

Hereinafter, a manufacturing tool for an optical connector of one or more embodiments is described with reference to the drawings.

Figure 1:
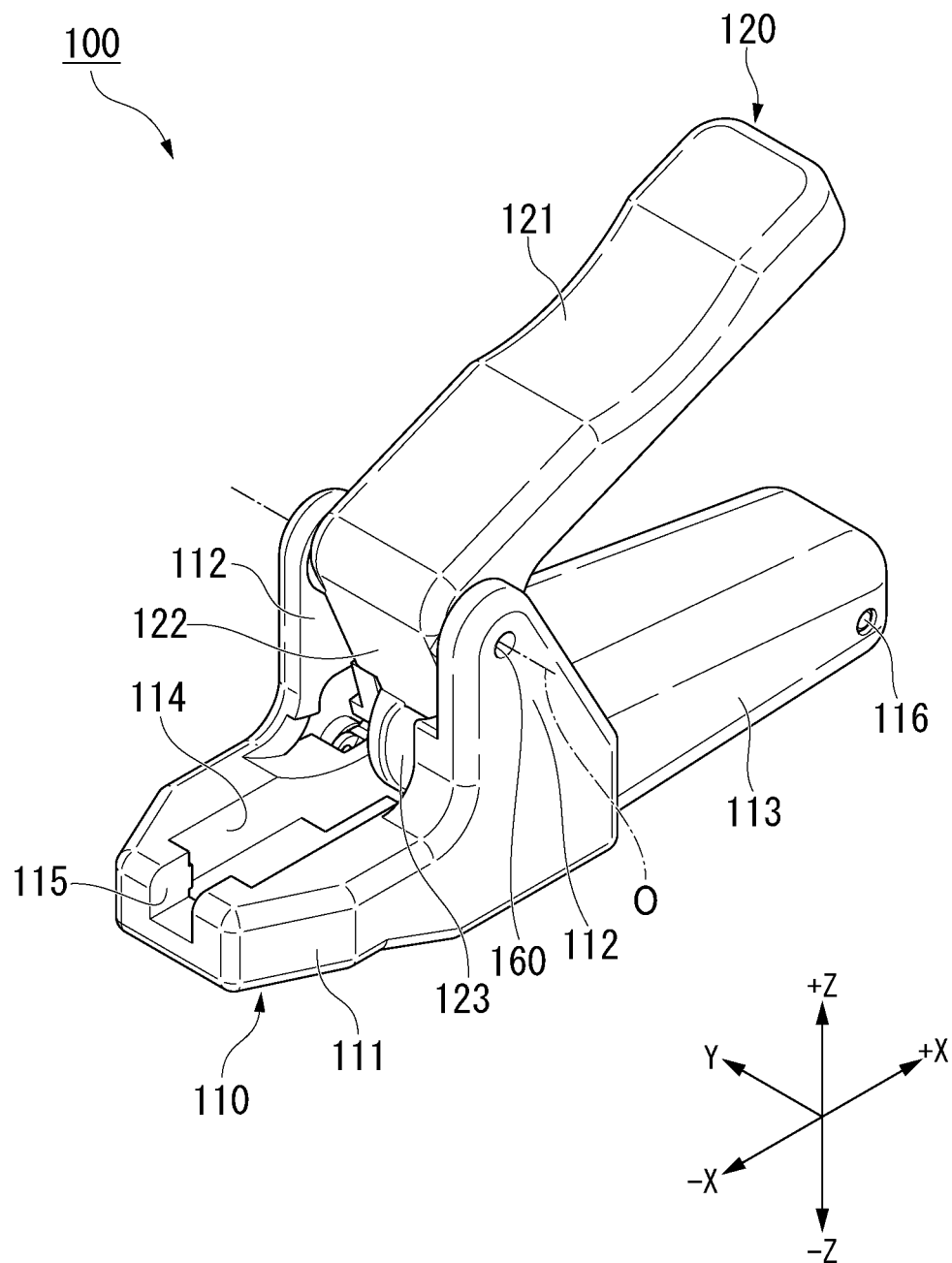
FIG. 1 is a perspective view of a manufacturing tool for an optical connector according to one or more embodiments.

As shown in FIG. 1, the manufacturing tool for an optical connector (hereinafter simply referred to as manufacturing tool 100) includes a tool body 110, a handle 120, and a connecting shaft (connecting shaft axis member) 160. The connecting shaft 160 rotatably connects the handle 120 to the tool body 110. The handle 120 has an operating part 121 operated by the user. When force is applied to the operating part 121, the handle 120 rotates around the connecting shaft 160 with respect to the tool body 110.

Direction Definition

In one or more embodiments, the XYZ Cartesian coordinate system is set and the positional relationship of each part will be described. The direction in which the central axis O of the connecting shaft 160 extends is referred to as a left-right direction Y. A direction orthogonal to the left-right direction Y is referred to as an up-down direction Z. The up-down direction Z is also the direction in which the operating part 121 moves when the handle 120 rotates around the connecting shaft 160. A direction orthogonal to both the left-right direction Y and the up-down direction Z is called an axial direction X. One side in the axial direction X is called the +X side, and the other side is called the −X side. One side in the up-down direction Z is called the +Z side or upward, and the other side is called the −Z side or downward. Viewing from the left-right direction Y is called side view. A direction that intersects the central axis O in a side view is called a radial direction.

The handle 120 rotates between a stand-by position shown in FIG. 1 and the like and a push-into position (not shown) in which the operating part 121 is positioned below the stand-by position. In the following description, the positional relationship of each part will be described when the handle 120 is in the stand-by position unless otherwise specified. When no external force is applied to the handle 120, the handle 120 is located at the stand-by position.

As shown in FIGS. 1 to 7, the tool body 110 has a connector set part 111, a pair of support parts 112, and a base part 113. A concave part 114 and a groove part 115 are formed in the connector set part 111. The concave part 114 and the groove part 115 are recessed downward from the upper surface of the connector set part 111. The groove part 115 is located at the −X side end part of the connector set part 111 and opens toward the −X side. The concave part 114 is located on the +X side of the groove part 115. The dimension of the groove part 115 in the left-right direction Y is smaller than the dimension of the concave part 114 in the left-right direction Y.

Figure 3:
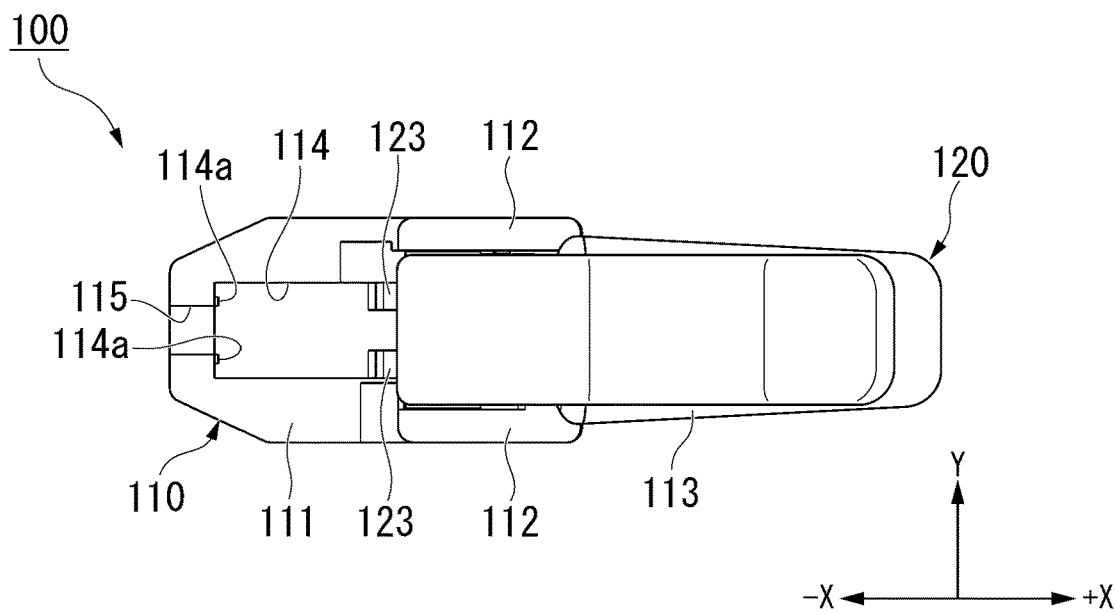
FIG. 3 is a top view of the manufacturing tool of FIG. 1.

As shown in FIG. 3, the inner surface of the concave part 114 is formed with a pair of projecting parts 114a that project toward the +X side. The pair of projecting parts 114a are disposed across the groove part 115 in the left-right direction Y. The pair of projecting parts 114a also face a pair of contact parts 123 (described later) of the handle 120 in the axial direction X.

Figure 2:
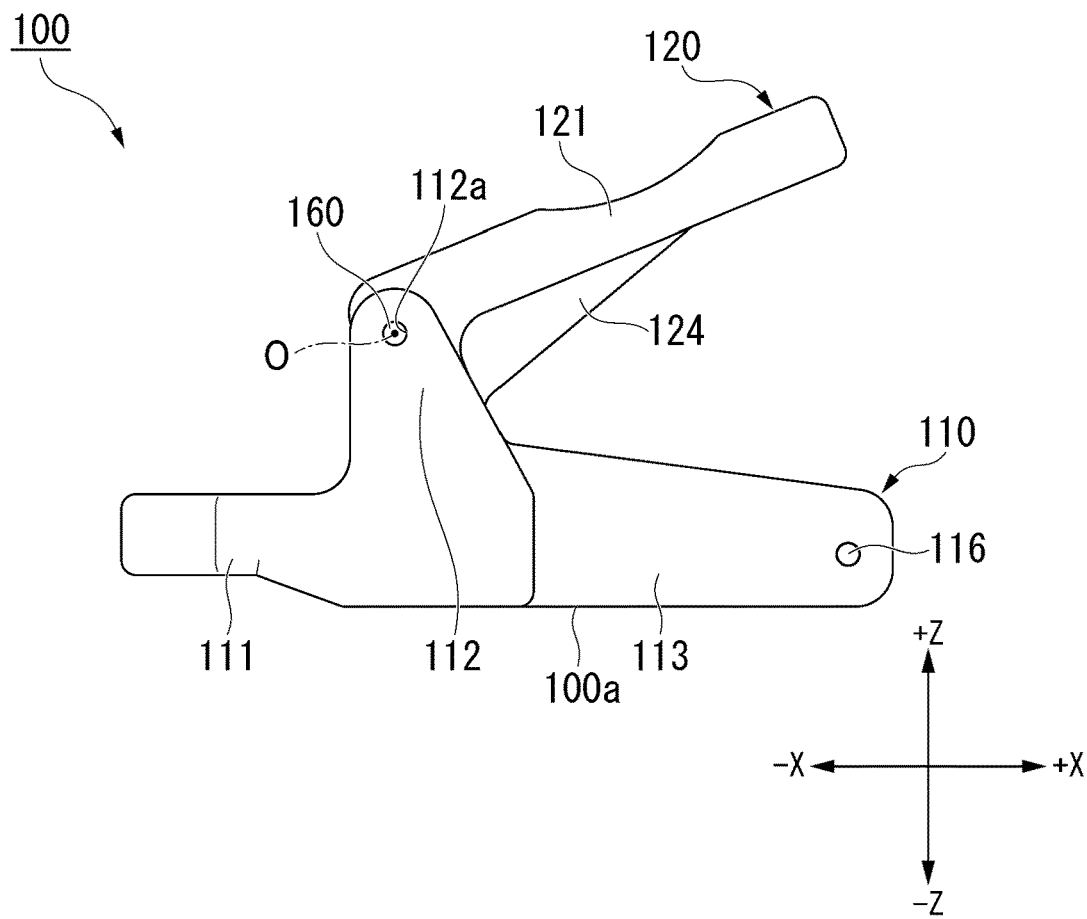
FIG. 2 is a right side view of the manufacturing tool of FIG. 1.

As shown in FIGS. 2 and 3, the pair of support parts 112 are located on the +X side of the connector set part 111. The pair of support parts 112 are spaced apart in the left-right direction Y and support both end parts of the connecting shaft 160. More specifically, a bearing hole 112a is formed in each support part 112, and both end parts of the connecting shaft 160 are inserted into these bearing holes 112a. The support part 112 projects upward from connector set part 111 and base part 113. The bearing hole 112a and the connecting shaft 160 are located above the concave part 114.

The base part 113 projects from the support part 112 to the +X side. As shown in FIG. 2, the lower surface of the support part 112 and the lower surface of the base part 113 are located on the same plane. The lower surface of the support part 112 and the lower surface of the base part 113 are used as a mounting surface 100a to be placed on a workbench or the like, when the manufacturing tool 100 is used. The lower surface of the connector set part 111 is located above the lower surface of the mounting surface 100a. Therefore, when the manufacturing tool 100 is placed on a workbench or the like, a gap in the up-down direction Z is formed between the connector set part 111 and the workbench or the like.

Figure 5:
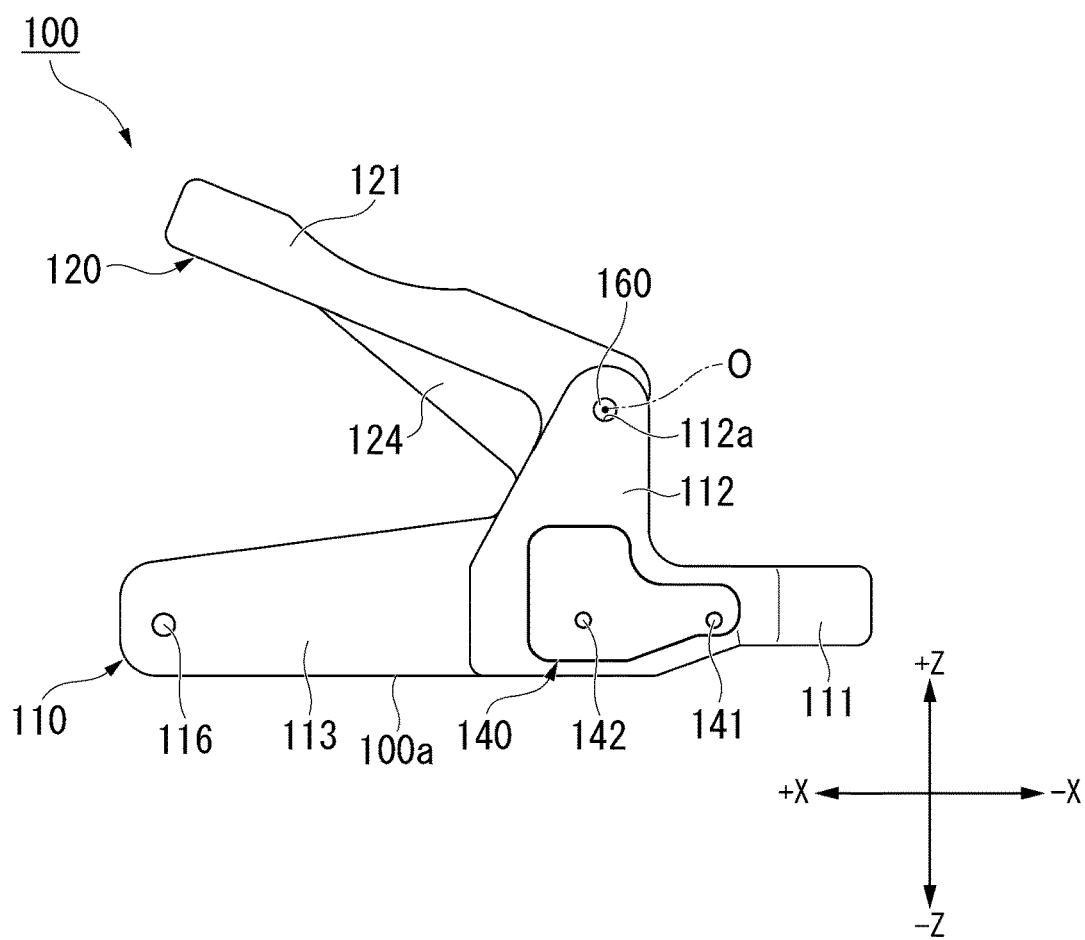
FIG. 5 is a left side view of the manufacturing tool of FIG. 1.
Figure 6:
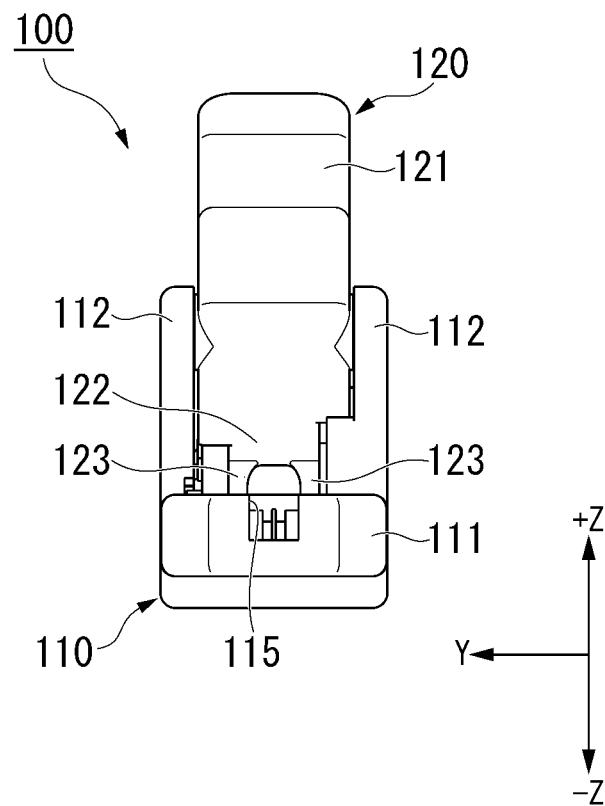
FIG. 6 is a front view of the manufacturing tool of FIG. 1.
Figure 7:
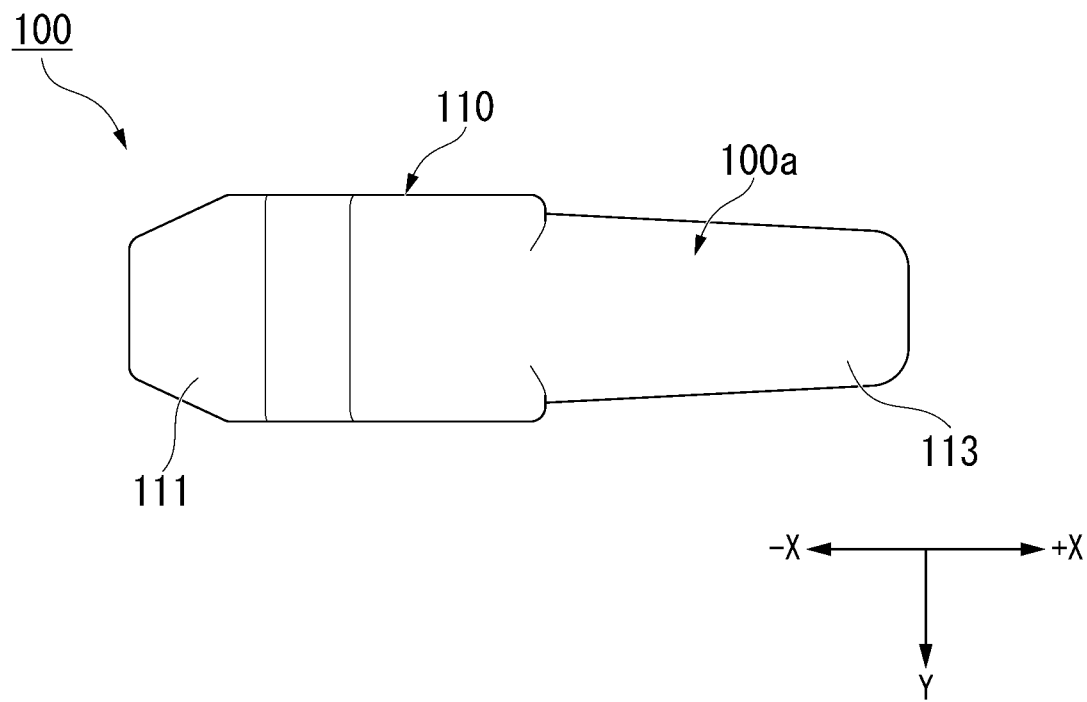
FIG. 7 is a bottom view of the manufacturing tool of FIG. 1.

As shown in FIG. 5, a plate 140 is attached to the left side surface of the tool body 110. The plate 140 covers an opening (not shown) formed in the left side surface of the tool body 110 and is fixed to the tool body 110. The plate 140 holds a spring hook part 141 and a ratchet shaft 142. The spring hook part 141 and the ratchet shaft 142 project from the plate 140 toward the inside of the tool body 110 and extend along the left-right direction Y.

Figure 8:
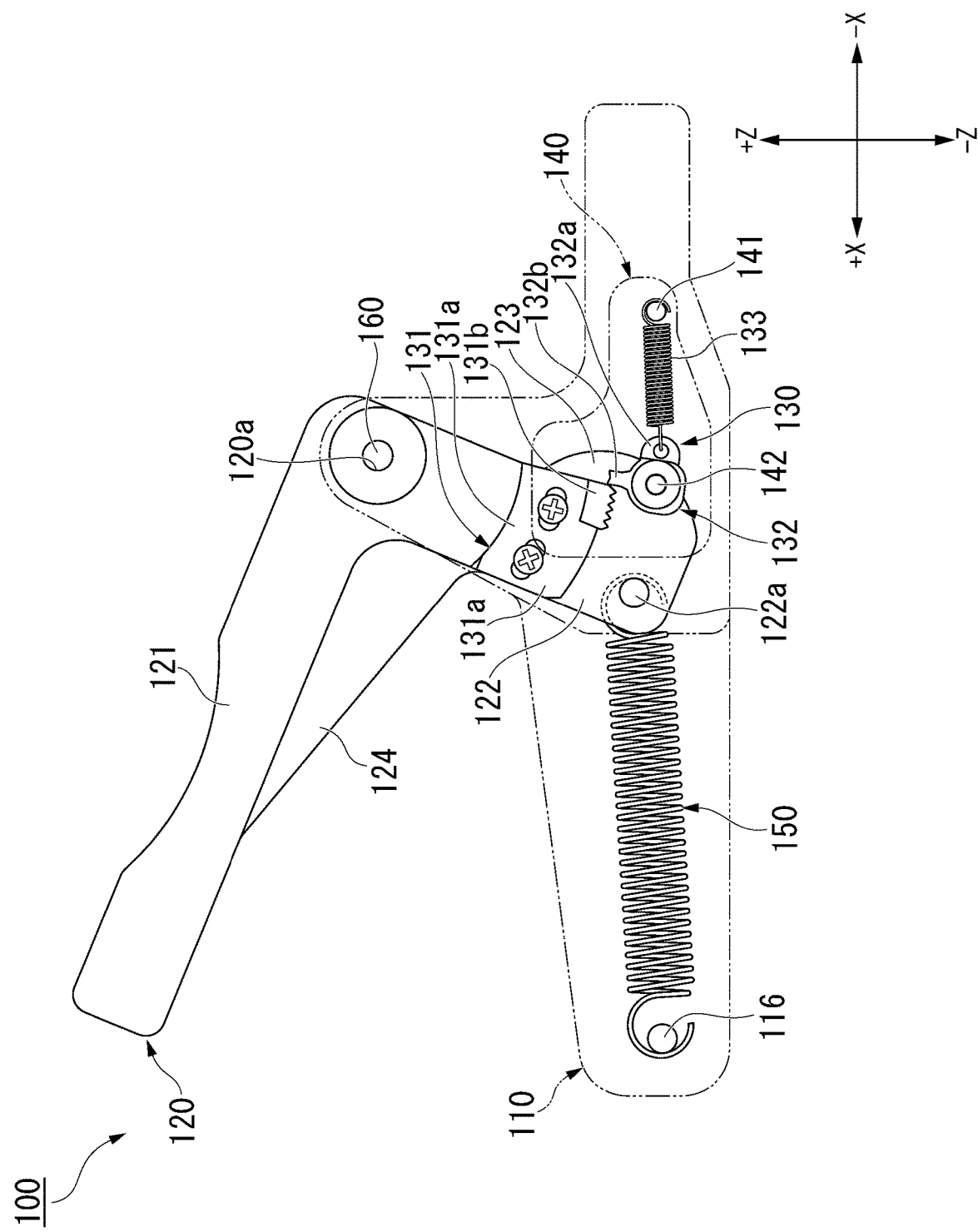
FIG. 8 is a left side view of the manufacturing tool of FIG. 1, omitting the display of a tool body.

As shown in FIG. 8, the handle 120 has an operating part 121, an arm part 122, a pair of contact parts 123 (see also FIG. 3), and a rib 124. Further, the handle 120 is formed with an insertion hole 120a through which the connecting shaft 160 is inserted. The insertion hole 120a penetrates the handle 120 in the left-right direction Y. The connecting shaft 160 is inserted through the insertion hole 120a and both end parts of the connecting shaft 160 are supported by the pair of support parts 112, so that the handle 120 is capable of rotating around the connecting shaft 160.

Figure 4:
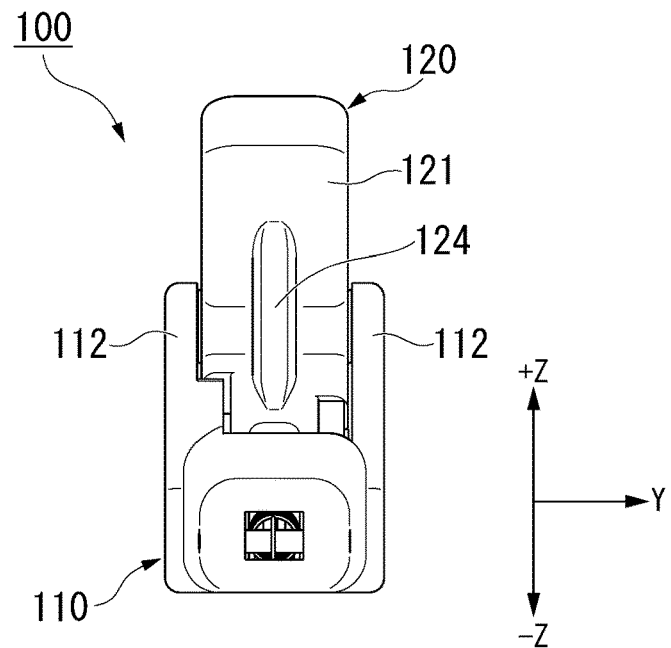
FIG. 4 is a rear view of the manufacturing tool of FIG. 1.

As shown in FIG. 2, the rib 124 projects downward from the operating part 121. As shown in FIG. 4, the rib 124 is located in the central part of the operating part 121 in the left-right direction Y.

As shown in FIG. 8, the operating part 121 and the arm part 122 are substantially L-shaped when viewed in the left-right direction Y. An insertion hole 120a is formed in a part (L-shaped corner part) where the operating part 121 and the arm part 122 are connected. A pair of contact parts 123 project from the lower end part of the arm part 122 toward the −X side. The radial length of the operating part 121 is longer than the radial length of the arm part 122. Therefore, according to the principle of leverage, the force that pushes the operating part 121 downward can be amplified and converted into a force that pushes the contact part 123 toward the −X side.

As shown in FIG. 8, the manufacturing tool 100 includes a ratchet mechanism (i.e., ratchet) 130. The ratchet mechanism 130 includes a first ratchet member 131, a second ratchet member 132, and a ratchet biasing member 133. The first ratchet member 131 is fixed to the handle 120. The second ratchet member 132 has a hole through which the ratchet shaft 142 is inserted, and is rotatable around the ratchet shaft 142. The first ratchet member 131 has a fixing part 131a and a first engaging part (i.e., first claw) 131b. The fixing part 131a is fixed to the arm part 122 with a screw. However, the method of fixing the fixing part 131a to the arm part 122 may be changed as appropriate. Further, the first ratchet member 131 may be formed integrally with the handle 120.

The first engaging part 131b has a plurality of protrusions (gears) arranged along the axial direction X while protruding downward. The second ratchet member 132 has a locking part 132a that locks the ratchet biasing member (i.e., spring) 133, and a second engaging part (i.e., second claw) 132b that engages with the gear of the first engaging part 131b. Both end parts of the ratchet biasing member 133 are locked to the locking part 132a and the spring hook part 141, respectively. The ratchet biasing member 133 is a tension coil spring, and applies a predetermined biasing force to the second ratchet member 132 via the locking part 132a. This biasing force acts as a moment to rotate the second ratchet member 132 around the ratchet shaft 142.

As shown in FIG. 8, the manufacturing tool 100 includes a handle biasing member (i.e., spring) 150. Both end parts of the handle biasing member 150 are locked to the spring hook part 116 provided on the tool body 110 and the spring hook part 122a provided on the handle 120, respectively. The handle biasing member 150 is a tension coil spring, and applies a predetermined biasing force to the handle 120 via the spring hook part 122a. This biasing force acts as a moment to rotate the operating part 121 of the handle 120 upward (toward the stand-by position) around the connecting shaft 160.

Next, an example of an optical connector to be assembled by the manufacturing tool 100 will be described. The optical connector described below is merely an example, and the manufacturing tool 100 of one or more embodiments can assemble optical connectors having other structures.

Figure 9:
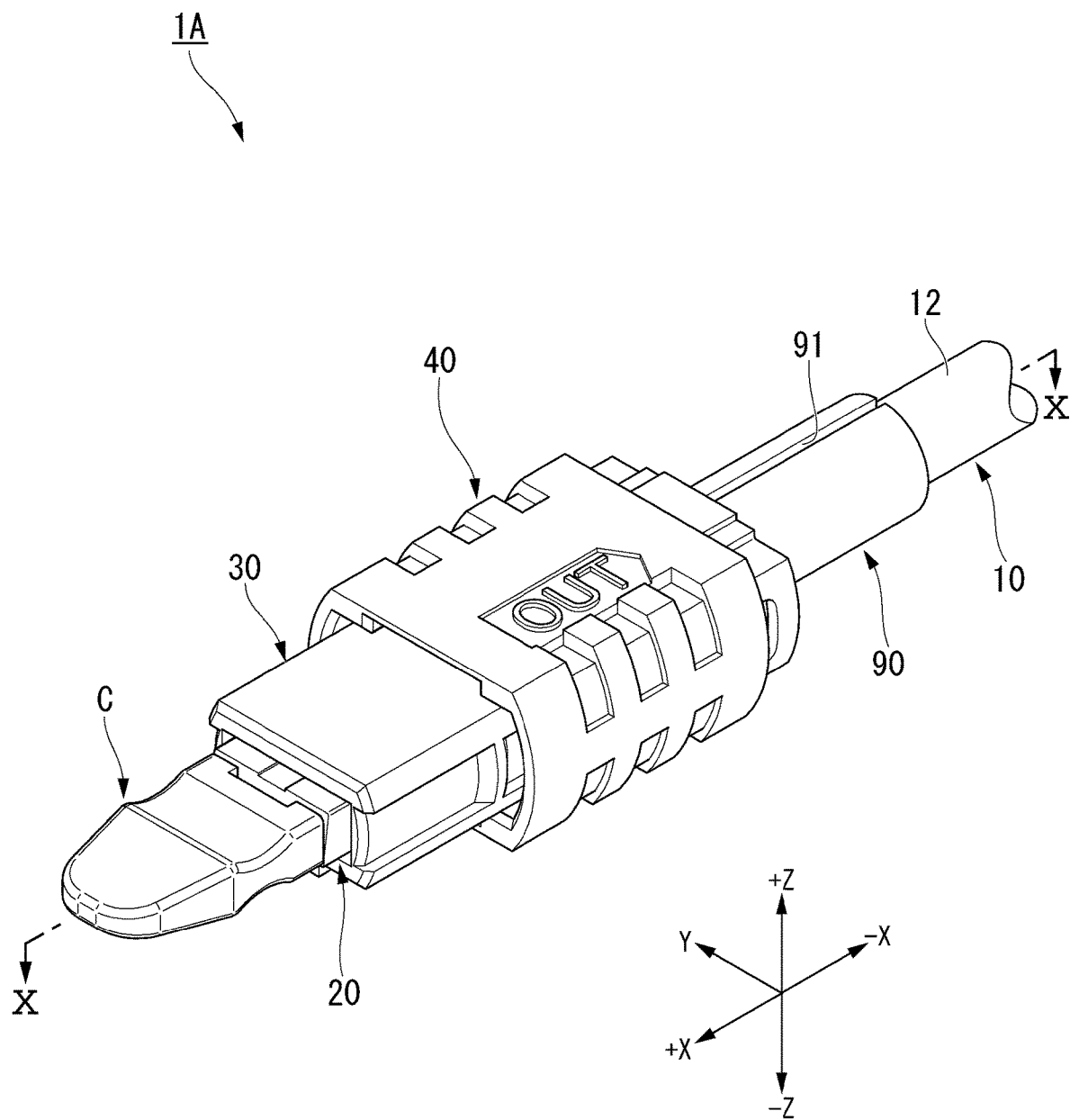
FIG. 9 is a perspective view showing an example of an optical connector manufactured by the manufacturing tool of FIG. 1.
Figure 10:
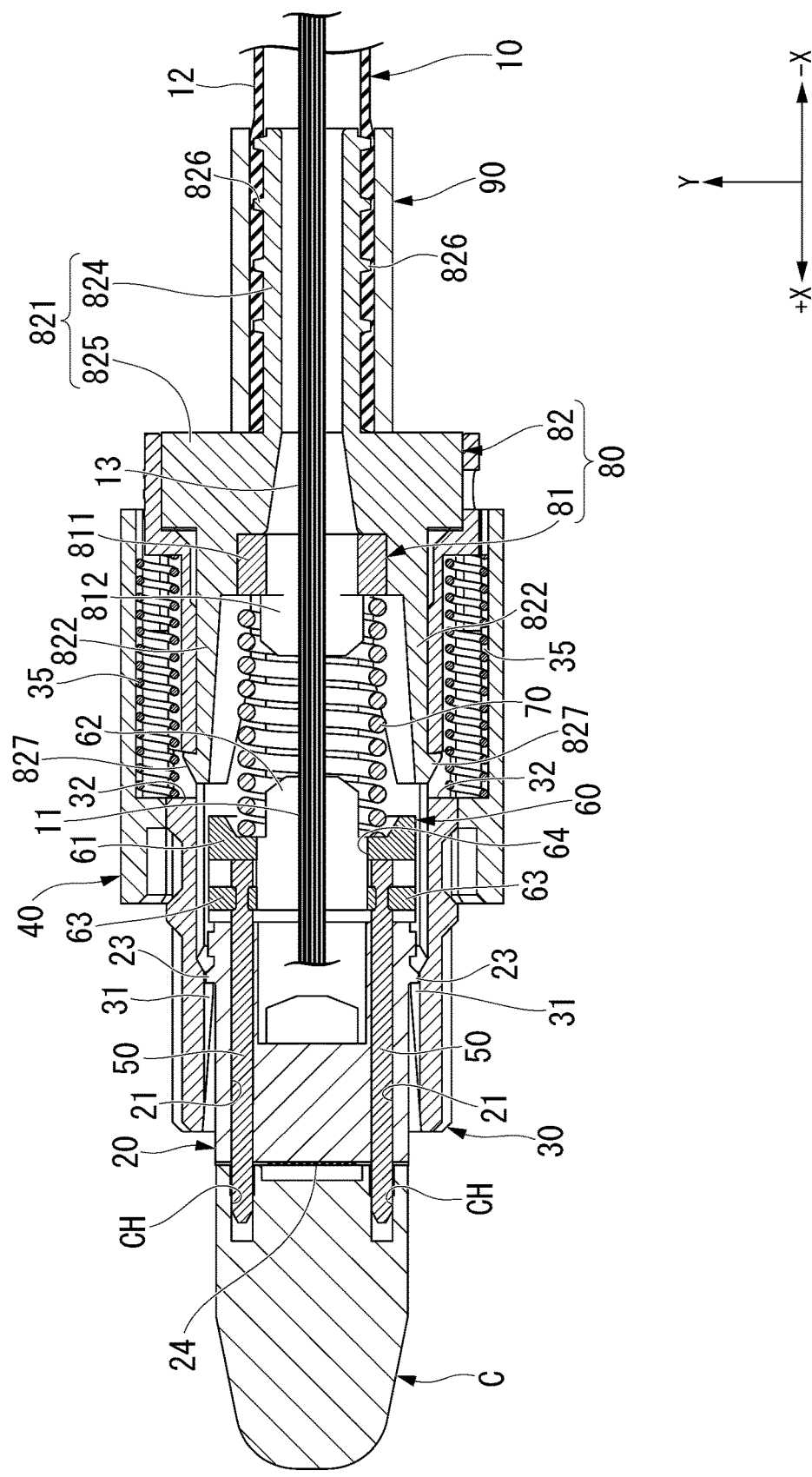
FIG. 10 is an X-X cross-sectional view of the optical connector of FIG. 9.
Figure 11:
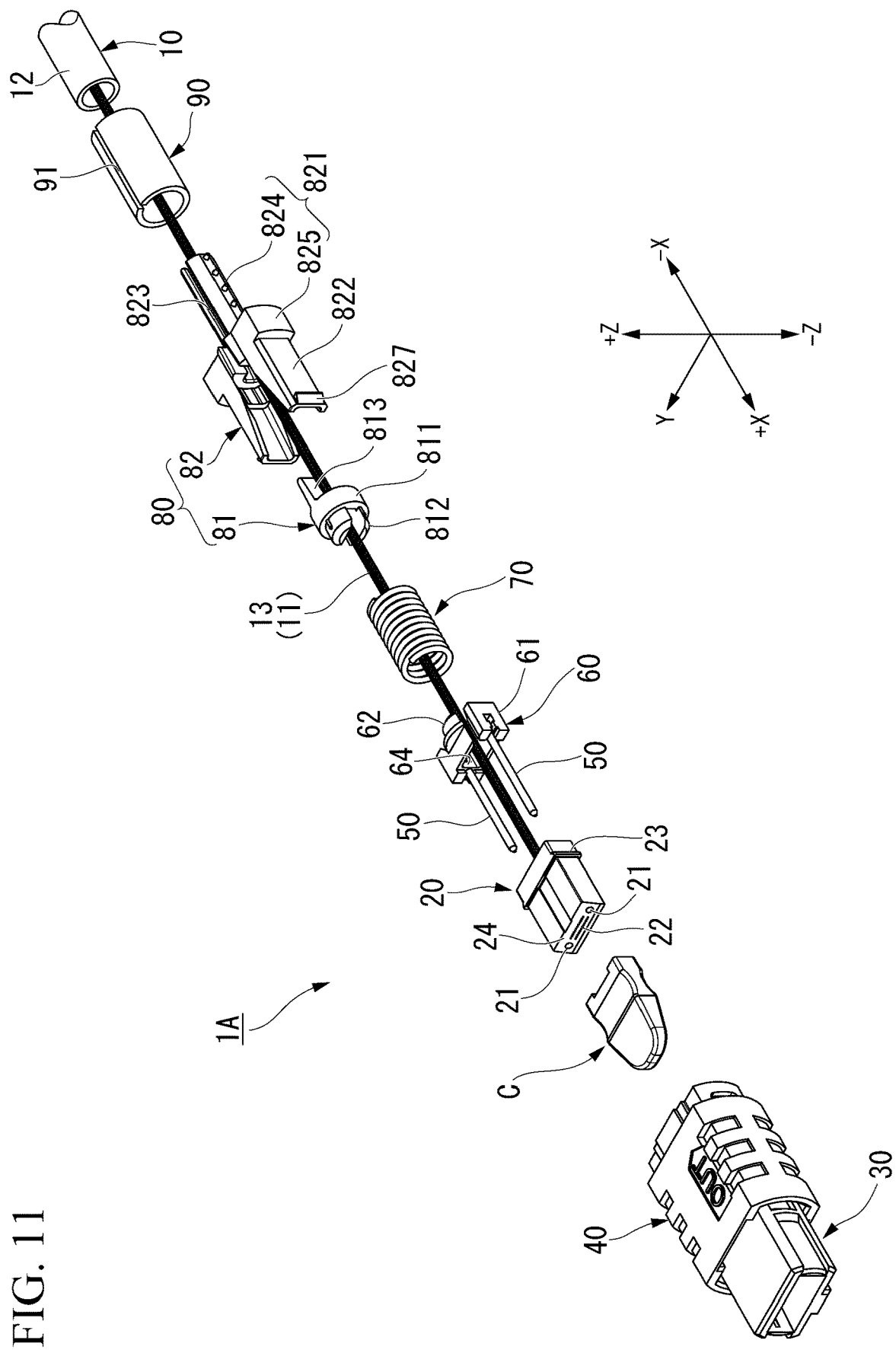
FIG. 11 is an exploded perspective view of the optical connector of FIG. 9.

As shown in FIGS. 9 to 11, the optical connector 1A includes an optical cable 10, a ferrule 20, a housing 30, a coupling 40, a cap C, two guide pins 50, a pin clamp 60, a spring 70, a spring push 80, and a crimp ring 90. The optical connector 1A of one or more embodiments is of a so-called Multi-fiber Push On (MPO) type.

The optical cable 10 has a plurality of optical fibers 11 and a jacket 12 covering the plurality of optical fibers 11. The end parts in the longitudinal direction of the plurality of optical fibers 11 are pulled out from the end parts of the jacket 12 to be inserted into the ferrule 20.

The ferrule 20 is formed with two guide holes 21, a plurality of fiber holes 22, and two restricting protrusions 23. The guide hole 21 and the fiber hole 22 are open to the connecting end face 24 of the ferrule 20. A guide pin 50 is inserted through each guide hole 21, and an end part of the optical fiber 11 of the optical cable 10 is inserted through each fiber hole 22. The number of fiber holes 22 that the ferrule 20 has may be changed as appropriate, and may be, for example, only one. That is, the number of optical fibers 11 included in the optical connector 1A may be one or plural.

The longitudinal direction of the optical fiber 11, the guide hole 21, and the fiber hole 22 coincide with the axial direction X. The two guide holes 21 or the two guide pins 50 are arranged in the left-right direction Y. The +X side in the axial direction X is the connecting end face 24 side or the tip side of the optical connector 1A, and the opposite side (−X side) is the base end side of the optical connector 1A. In the following description of the optical connector 1A, the +X side may be referred to as the front and the −X side may be referred to as the rear.

A guide hole 21 and a fiber hole 22 of the ferrule 20 penetrate the ferrule 20 in the axial direction X, individually. Further, the restricting protrusions 23 of the ferrule 20 project outward from both ends of the ferrule 20 in the left-right direction Y. The housing 30 is formed in a tubular shape extending in the axial direction X. The housing 30 opens forward and backward. The ferrule 20 is inserted into the housing 30 from the −X side.

As shown in FIG. 10, the housing 30 has two locking holes 32 formed therein. The two locking holes 32 are formed in both side surfaces of the housing 30 (surfaces facing the left-right direction Y). The coupling 40 is formed in a tubular shape extending in the axial direction X and surrounds the housing 30 from the outside. Although detailed description is omitted, the coupling 40 is a member that is gripped and pulled backward by a user when pulling out the optical connector 1A from a connection object (such as an adapter).

As shown in FIG. 10, two second springs 35 are provided between the housing 30 and the coupling 40 in the axial direction X. The two second springs 35 are arranged on both sides of the housing 30 in the left-right direction Y. The second spring 35 biases the coupling 40 forward and biases the housing 30 backward. The second spring 35 has a role of restoring forward the coupling 40 that has moved backward with respect to the housing 30.

The pin clamp 60 is disposed behind the ferrule 20 and holds the rear end part of the guide pin 50 projecting backward from the ferrule 20. The pin clamp 60 has a clamp body 61 and a spring holding part 62. The clamp body 61 includes two pin holders 63 that each holds the rear end parts of one of the two guide pins 50. The spring holding part 62 projects backward from the clamp body 61. The spring holding part 62 holds the front end part of the spring 70 disposed behind the pin clamp 60. The pin clamp 60 is formed with an insertion hole 64 that penetrates in the axial direction X. The extending part 13 of the optical fiber 11 extending backward from the ferrule 20 is inserted through the insertion hole 64.

The cap C covers the fiber hole 22 opening on the connection end face 24 of the ferrule 20 from the front, thereby preventing the end face of the optical fiber 11 exposed at the connecting end face 24 from being stained or damaged. The cap C has two fitting holes CH. A front end part of a guide pin 50 projecting forward from the connecting end face 24 of the ferrule 20 is fitted into the two fitting holes CH.

The spring 70 is disposed behind the ferrule 20 and the pin clamp 60 and is elastically deformable in the axial direction X. Specifically, the spring 70 is a cylindrical coil spring that elastically expands and contracts in the axial direction X. The extending part 13 of the optical fiber 11 is inserted inside the spring 70 behind the pin clamp 60. The spring 70 is accommodated inside the housing 30 together with the ferrule 20 and the pin clamp 60.

The spring push 80 sandwiches the spring 70 between the spring push 80 and the pin clamp 60 in the axial direction X. The spring push 80 has a first member 81 and a second member 82, through which the optical fiber 11 can be inserted. Note that the first member 81 and the second member 82 may be integrally formed.

The first member 81 is disposed behind the spring 70 and is provided so as to contact the rear end part of the spring 70. Although not shown, the first member 81 can be accommodated inside the housing 30 together with the ferrule 20, the pin clamp 60 and the spring 70 while being disposed at the rear end part of the spring 70. As shown in FIG. 11, the first member 81 has a body part 811, a spring holding part 812, and a positioning protrusion 813.

The body part 811 is formed in a tubular shape corresponding to the spring 70. The extending part 13 of the optical fiber 11 is inserted inside the body part 811 behind the spring 70. The size of the body part 811 as seen from the axial direction X corresponds to the size of the outer diameter of the tubular spring 70. Accordingly, the body part 811 is able to cover the rear end of the spring 70 by disposing the first member 81 behind the spring 70.

The second member 82 supports the first member 81 from behind (base end side). Further, the second member 82 is locked to the housing 30. The second member 82 has a cylindrical part 821 and two locking pieces 822. The two locking pieces 822 each extend forward from the cylindrical part 821. Specifically, the two locking pieces 822 extend forward from both end parts in the left-right direction Y of an extended part 825 of the cylindrical part 821. A locking protrusion 827 is formed at the front end of each locking piece 822. Each locking protrusion 827 projects outward from the second member 82 in the left-right direction Y from the locking piece 822.

As shown in FIG. 10, each locking protrusion 827 is locked into the locking hole 32 of the housing 30. Specifically, the cylindrical part 821 of the second member 82 sandwiches the pin clamp 60, the spring 70, and the first member 81 between the cylindrical part 821 and the ferrule 20 in the axial direction X, and the locking protrusion 827 of the second member 82 is locked into the locking hole 32 of the housing 30 while the locking piece 822 of the second member 82 is inserted into the housing 30 from behind. In this state, the spring 70 is elastically compressed and deformed (elastic deformation), and the ferrule 20 is biased forward by the elastic force of the spring 70. The elastic force (biasing force) generated by the spring 70 is, for example, about 2 kgf. The greater the biasing force, the more difficult it becomes to push the spring push 80 into the housing 30 while compressing the spring 70 when manufacturing the optical connector 1A.

The crimp ring 90 is formed in a cylindrical shape. A slit 91 extending over the entire length of the crimp ring 90 in the axial direction X is formed in the crimp ring 90.

Next, an example of a manufacturing method for manufacturing the optical connector 1A of one or more embodiments will be described.

When manufacturing the optical connector 1A, the first step is performed first. In the first step, the ferrule 20, the pin clamp 60 holding two guide pins 50, the spring 70, and the first member 81 are disposed in order from the end part of the optical fiber 11.

In the first step, the end part of the optical fiber 11 pulled out from the jacket 12 of the optical cable 10 is inserted through the first member 81, the spring 70, and the pin clamp 60 and then inserted into the fiber hole 22 of the ferrule 20. Next, the pin clamp 60 is brought into contact with the rear of the ferrule 20, each of the two guide pins 50 held by the pin clamp 60 is inserted into the guide hole 21 from the rear of the ferrule 20, and the front end part of each guide pin 50 projects from the connecting end face 24 of the ferrule 20. Further, both end parts of the spring 70 are held by the pin clamp 60 and the spring holding part 812 of the first member 81. Furthermore, by fitting the front end part of each guide pin 50 into the fitting hole CH of the cap C, the cap C covers the fiber hole 22 opening in the connecting end face 24 of the ferrule 20. This completes the first step.

After the first step, the second step is performed. In the second step, the extending part 13 of the optical fiber 11 extending behind the ferrule 20 is inserted through the cylindrical part 821 of the second member 82 behind the first member 81. In one or more embodiments, the extending part 13 of the optical fiber 11 is passed through the slit 823 of the cylindrical part 821, so that the extending part 13 is inserted inside the cylindrical part 821.

After that, the second member 82 is moved forward to support the first member 81 from behind. By inserting the positioning protrusion 813 of the first member 81 into the slit 823 of the second member 82, the first member 81 and the second member 82 are relatively positioned.

In the second step, the extending part 13 of the optical fiber 11 is inserted through the crimp ring 90 behind the second member 82. Specifically, similar to the second member 82, the extending part 13 of the optical fiber 11 is passed through the slit 91 of the crimp ring 90, so that the extending part 13 is inserted inside the crimp ring 90.

Figure 12:
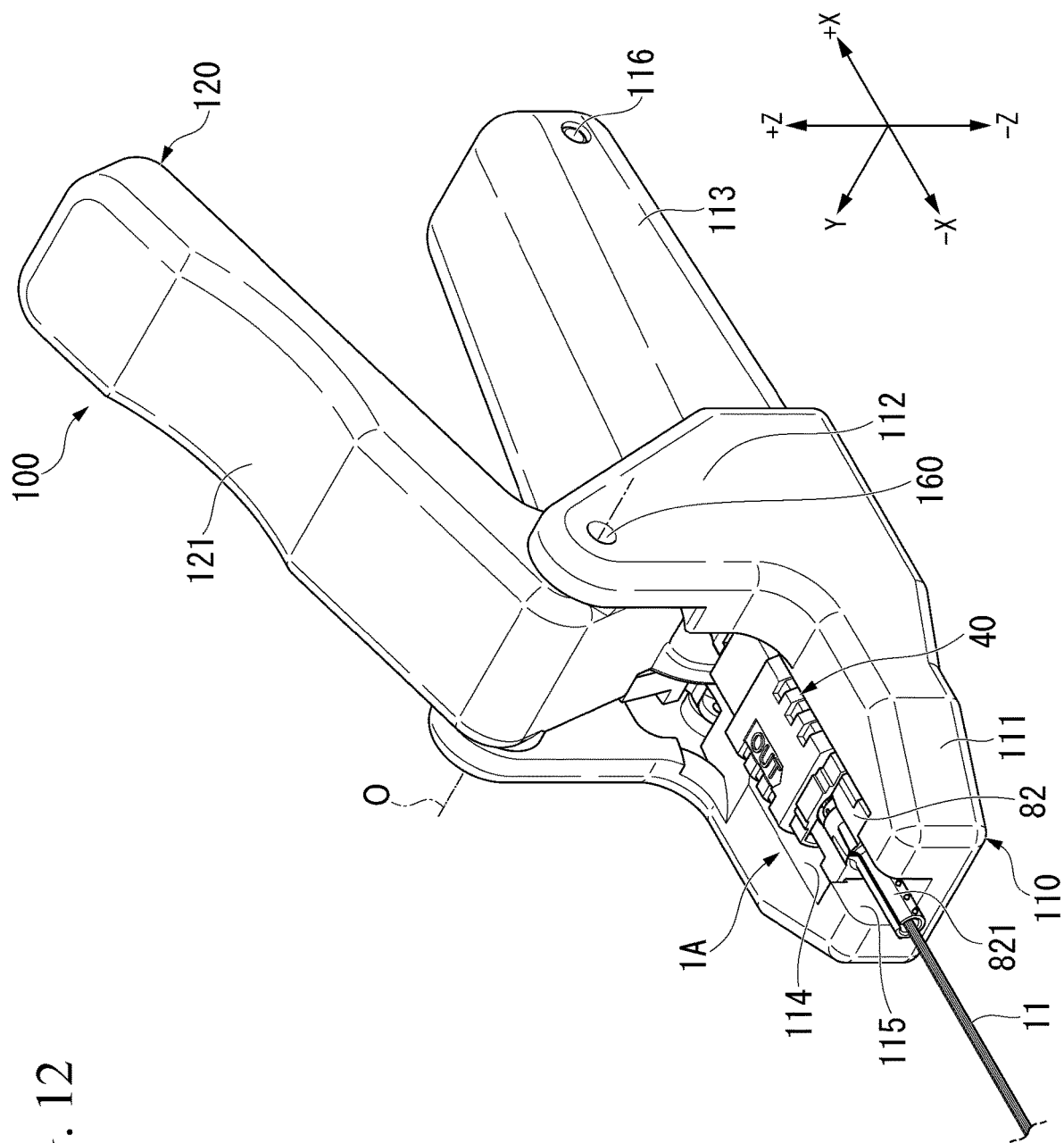
FIG. 12 is a diagram showing how an optical connector is manufactured by the manufacturing tool of FIG. 1.
Figure 13:
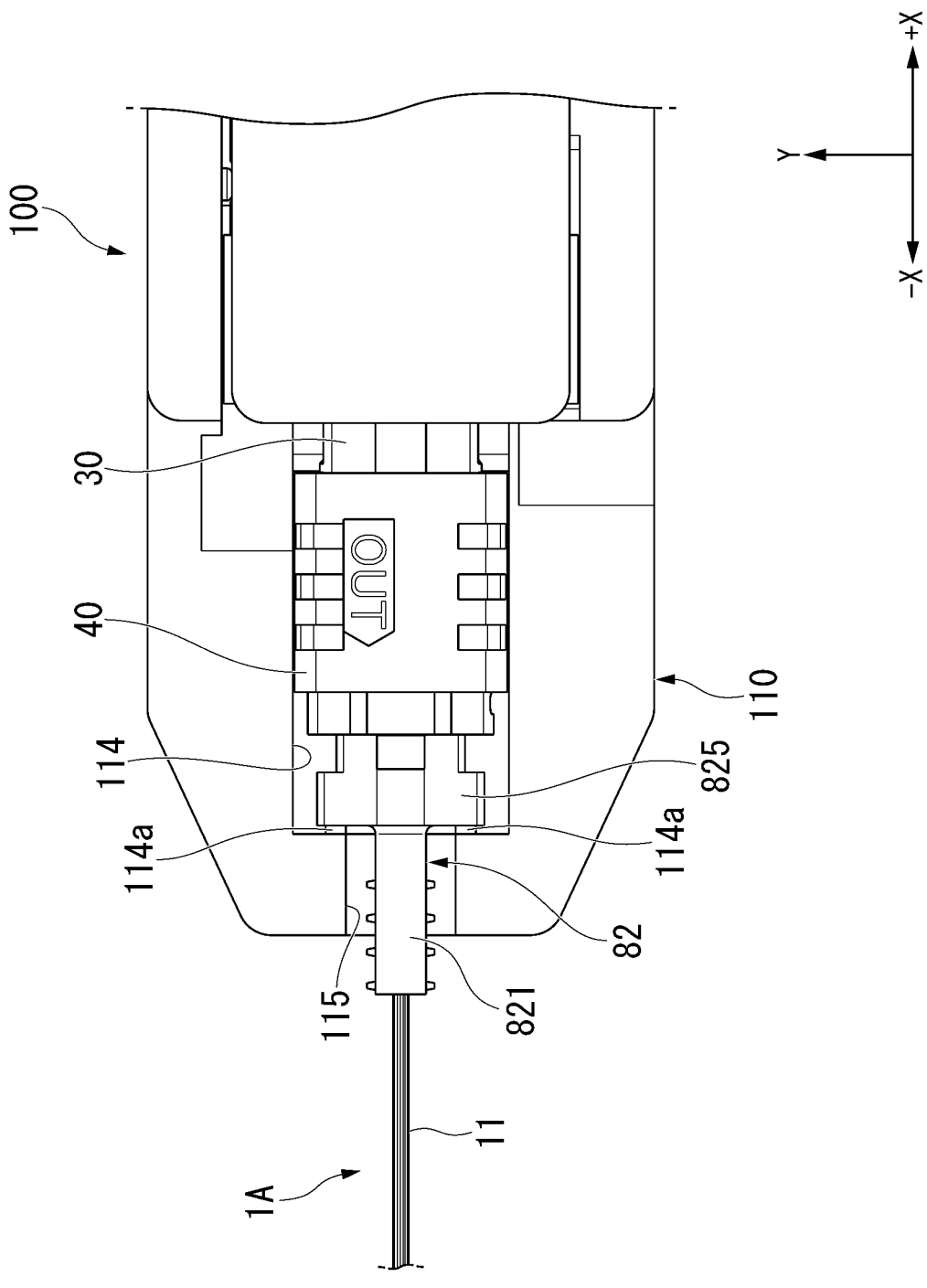
FIG. 13 is a top view corresponding to FIG. 12.
Figure 14:
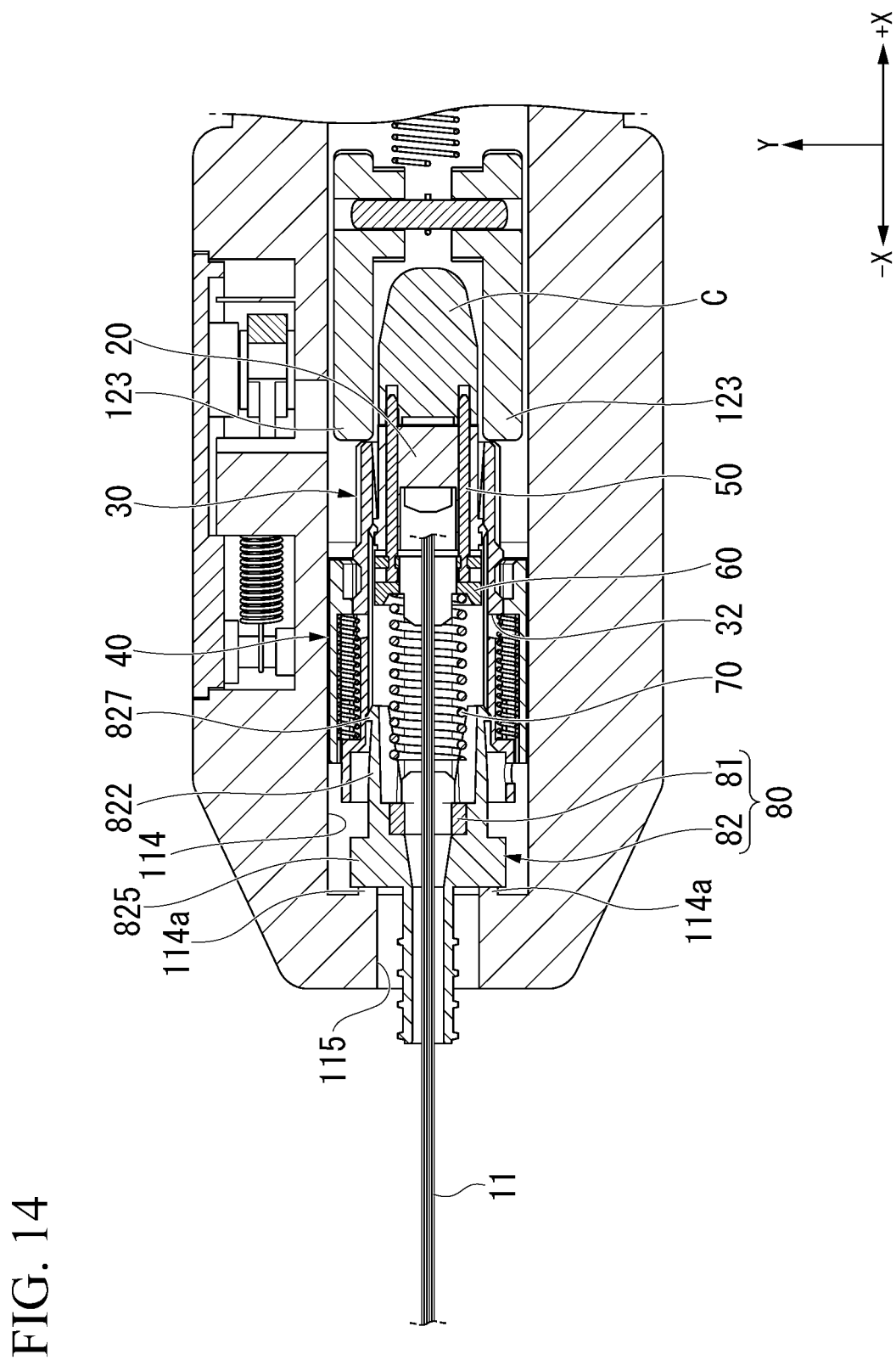
FIG. 14 is a cross-sectional view corresponding to FIG. 12.

After the second step, the third step is performed. In the third step, the ferrule 20, the pin clamp 60, the spring 70, and the first member 81 are accommodated inside the housing from the rear (−X side), and the second member 82 is locked to the housing 30. Thus, the spring 70 is elastically deformed, and the ferrule 20 is biased forward by the elastic force of the spring 70. Here, in one or more embodiments, the manufacturing tool 100 is used in the third step. More specifically, as shown in FIGS. 12 to 14, the housing 30 and the like are set in the concave part 114 of the manufacturing tool 100. At this time, the cylindrical part 821 of the spring push 80 and the optical fiber 11 are placed inside the groove part 115. Inside the concave part 114, the tip of the ferrule 20 and the cap C are placed between the pair of contact parts 123. The tip of the ferrule 20 and the cap C placed between the pair of contact parts 123 may not be in contact with the contact parts 123. The third step can be performed while the mounting surface 100a of the manufacturing tool 100 is placed on a workbench or the like. Further, the third step may be performed while the manufacturing tool 100 is fixed to a workbench or the like.

As shown in FIG. 13, in the state before the third step, the extended part 825 of the spring push 80 projects from the housing 30 toward the −X side. In this state, the locking protrusion 827 is not locked in the locking hole 32, as shown in FIG. 14.

Figure 15:
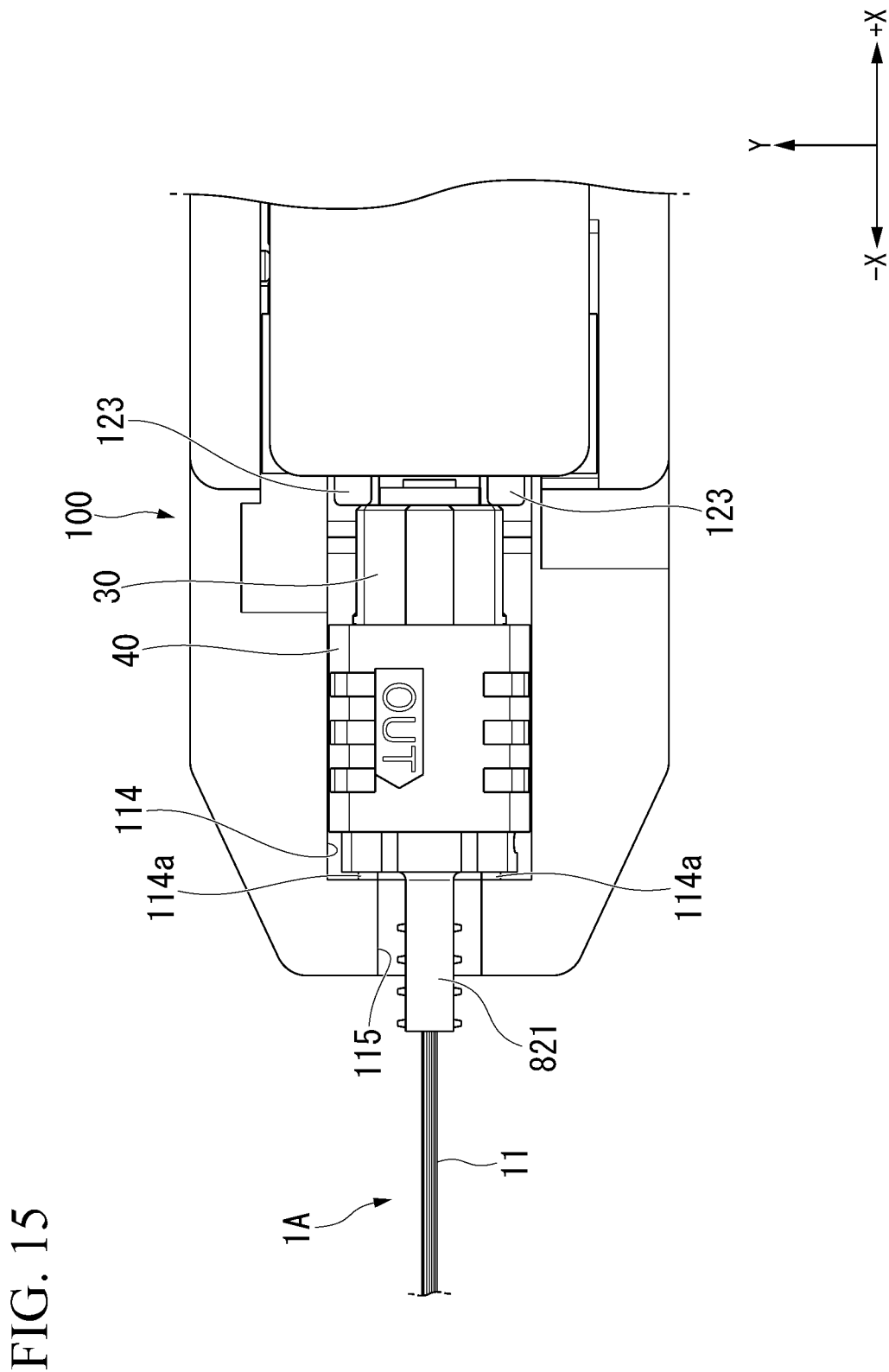
FIG. 15 is a top view showing a state after a handle is operated and moved to a push-into position from FIG. 13.
Figure 16:
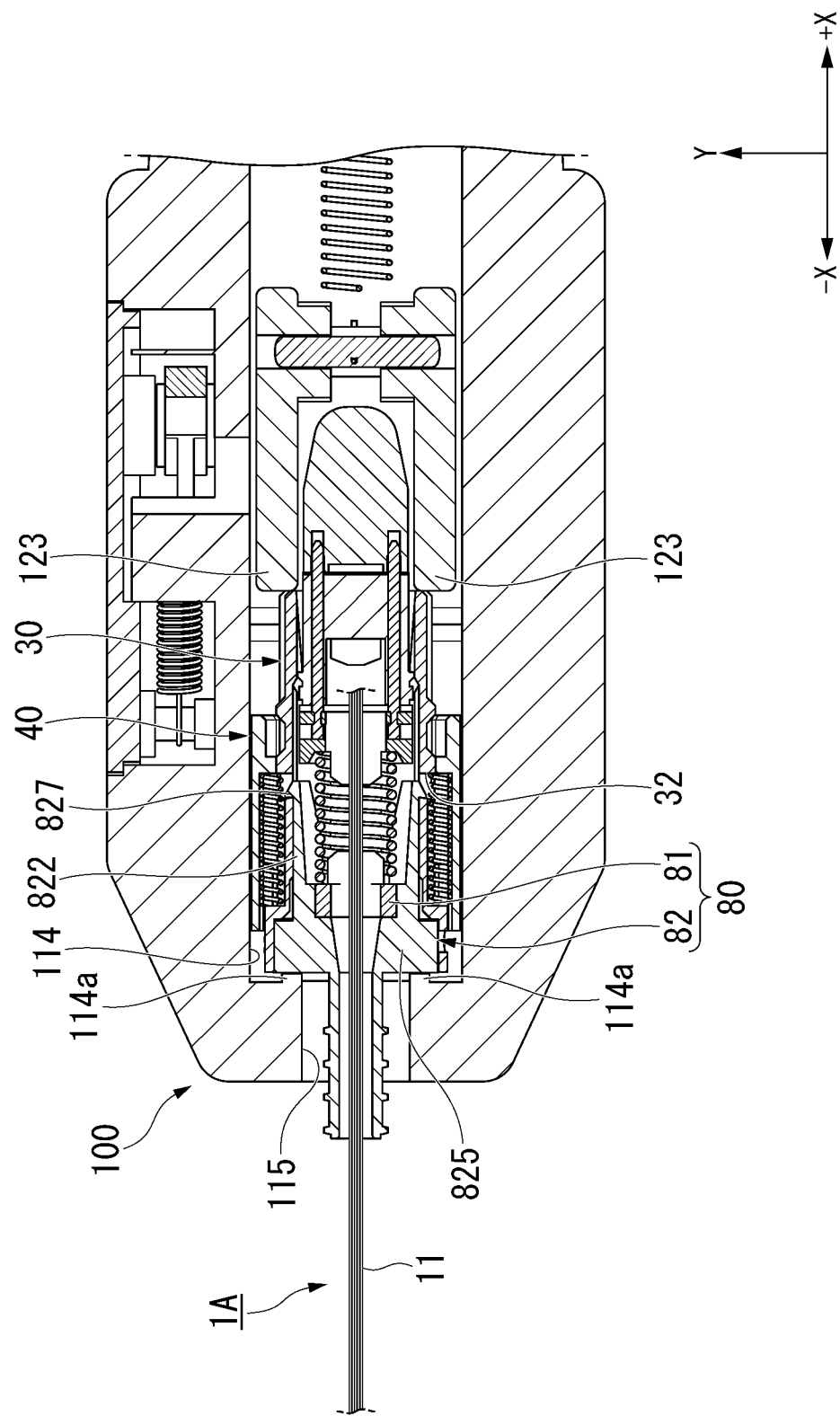
FIG. 16 is a cross-sectional view corresponding to FIG. 15.

Next, by pressing the operating part 121, the handle 120 is rotated around the connecting shaft 160. Thus, the handle 120 moves from the stand-by position to the push-into position where the contact part 123 projects inside the concave part 114. More specifically, as shown in FIG. 15, the contact part 123 moves to the −X side and pushes the housing 30. At this time, since the extended part 825 of the spring push 80 is supported by the pair of projecting parts 114a, the position of the spring push 80 with respect to the manufacturing tool 100 does not change. When the housing 30 pushed by the contact part 123 moves to the −X side with respect to the spring push 80, the locking protrusion 827 of the spring push 80 is locked to the locking hole 32 of the housing 30, as shown in FIG. 16.

Next, the housing 30 and the like are removed from the manufacturing tool 100, and a fixing step is performed. In the fixing step, the cylindrical part 821 of the second member 82 is inserted into the jacket 12 of the optical cable 10, and the cylindrical part 821 and the jacket 12 are crimped and fixed from the outside by the crimp ring 90. Thus, the manufacture of the optical connector 1A is completed.

In addition, in the manufacturing method for manufacturing the optical connector 1A described above, the fixing step may be performed, for example, between the second step and the third step. In this case, the crimp ring 90 and the jacket 12 may be set inside the groove part 115 in the third step.

Next, the action of the ratchet mechanism 130 when performing the third step will be described.

When the handle 120 moves from the stand-by position to the push-into position, the gear of the first engaging part 131b shown in FIG. 8 rides over the second engaging part 132b toward the −X side. Before the handle 120 reaches the push-into position, for example, when the user releases the operating part 121, the biasing force generated by the handle biasing member 150 acts to move the handle 120 to the stand-by position. However, by engaging the second engaging part 132b with the first engaging part 131b, rotation of the handle 120 toward the stand-by position is restricted (locked).

When the handle 120 reaches the push-into position, the gear of the first engaging part 131b rides over the second engaging part 132b to the −X side, so that the lock is released. Therefore, when the user releases the operating part 121, the handle 120 is restored and displaced toward the stand-by position by the biasing force of the handle biasing member 150. According to this configuration, when the user stops operating the handle 120 before the third step is completed, the ratchet mechanism 130 operates and the handle 120 is not displaced back to the stand-by position. Therefore, the user can easily recognize that the third step has not been completed, that is, the locking between the spring push 80 and the housing 30 has not been completed.

As described above, a manufacturing tool 100 for an optical connector according to one or more embodiments includes a tool body 110 in which a concave part 114 is formed; a handle 120 having an operating part 121 and a contact part 123; a connecting shaft 160 that rotatably connects the handle 120 to the tool body 110, in which the handle 120 is rotatable between a stand-by position and a push-into position in which the contact part 123 projects towards an inside of the concave part 114 more than when in the stand-by position, and when the handle 120 moves from the stand-by position to the push-into position, a direction in which the operating part 121 moves (that is, the up-down direction Z) and a direction in which the contact part 123 moves (that is, the axial direction X) are different with each other.

According to this configuration, by setting the housing 30 and the like of the optical connector 1A in the concave part 114 and operating the operating part 121, it is possible to have the contact part 123 projected inside the concave part 114. By pushing the housing 30 with the contact part 123, the spring push 80 can be locked to the housing 30. By using the manufacturing tool 100 in this manner, the spring push 80 can be easily pushed into the housing 30, and it is possible to improve manufacturing efficiency. Further, since the direction in which the operating part 121 moves and the direction in which the contact part 123 moves are different with each other, it is possible to make the manufacturing tool 100 compact even in a structure that uses the principle of leverage to amplify the operation force and obtain the pushing force.

The manufacturing tool 100 further includes a ratchet mechanism 130 that restricts movement of the handle 120 toward the stand-by position when the handle 120 is positioned between the stand-by position and the push-into position; and a handle biasing member 150 that biases the handle 120 toward the stand-by position, in which the ratchet mechanism 130 includes a first engaging part 131b fixed to the handle 120, a second engaging part 132b rotatable about a ratchet shaft 142 provided on the tool body 110, and a ratchet biasing member 133 that biases the second engaging part 132b.

According to this configuration, when the user stops the operation before the handle 120 reaches the push-into position, the ratchet mechanism 130 operates to restrict the movement of the handle 120 toward the stand-by position. Therefore, it is possible for the user to easily recognize that the handle 120 has not reached the push-into position, that is, the pushing of the housing 30 against the spring push 80 has not been completed. Therefore, the manufacturing efficiency of the optical connector 1A can be further improved.

Further, the tool body 110 includes a connector set part 111 in which a concave part 114 formed, a base part 113 to which the operating part 121 approaches when the handle 120 moves from the stand-by position to the push-into position, and a pair of support parts 112 located between the connector set part 111 and the base part 113 and supporting the connecting shaft 160. According to this configuration, when the handle 120 is pressed, the base part 113 is positioned below the operating part 121, and it is possible for the user to easily apply force. Further, since the operating part 121 is disposed apart from the connector set part 111, the optical connector 1A set in the concave part 114 can be easily seen when the handle 120 is operated. Therefore, it is possible to further improve operability.

Further, the inner surface of the concave part 114 is formed with projecting parts 114a that project toward the contact part 123. According to this configuration, when the housing 30 is pushed by the contact part 123, the projecting part 114a can abut against the spring push 80. As shown in FIG. 16, the projecting part 114a is disposed at a position not in contact with the housing 30. As a result, it is possible to prevent the −X side end part of the housing 30 from coming into contact with the inner surface of the concave part 114 and hindering the relative movement of the housing 30 and the spring push 80. That is, by providing the projecting part 114a, it is possible to move the housing 30 and the spring push 80 with each other more reliably.

It should be noted that the technical scope of the present invention is not limited to the above-described embodiments, and various modifications can be made without departing from the spirit of the present invention.

For example, the manufacturing tool 100 of the above embodiments has the ratchet mechanism 130, but the optical connector 1A can be assembled without the ratchet mechanism 130. Therefore, the ratchet mechanism 130 may be omitted.

Further, even when the projecting part 114a is not provided inside the concave part 114, the housing 30 can be pushed into the spring push 80 by bringing the extended part 825 of the spring push 80 into contact with the inner surface of the concave part 114, for example. Therefore, the projecting part 114a may be omitted.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1A: Optical connector
100: Manufacturing tool
110: Tool body
111: Connector set part
112: Support part
113: Base part
114: Concave part
114a: Projecting part
120: Handle
121: Operating part
123: Contact part
130: Ratchet mechanism
131b: First engaging part
132b: Second engaging part
133: Ratchet biasing member

142: Ratchet shaft
150: Handle biasing member
160: Connecting shaft

What is claimed is:

1. A manufacturing tool for an optical connector, comprising:
   a tool body that comprises a concave part;
   a handle that comprises: an operating part; and a contact part, wherein the handle is rotatable between: a stand-by position, and a push-into position in which a larger portion of the contact part is disposed inside the concave part than in the stand-by position;
   a connecting shaft that rotatably connects the handle to the tool body;
   a ratchet that restricts movement of the handle toward the stand-by position when the handle is disposed between the stand-by position and the push-into position; and
   a first spring that biases the handle toward the stand-by position, wherein
   a direction in which the operating part moves is different from a direction in which the contact part moves, and
   the ratchet comprises:
      a first claw fixed to the handle;
      a second claw rotatable about a ratchet shaft on the tool body; and
      a second spring that biases the second claw.

2. A manufacturing tool for an optical connector, comprising:
   a tool body that comprises a concave part;
   a handle that comprises:
      an operating part; and
      a contact part; and
   a connecting shaft that rotatably connects the handle to the tool body, wherein
   the handle is rotatable between:
      a stand-by position,
      a push-into position in which a larger portion of the contact part is disposed inside the concave part than in the stand-by position, and
   a direction in which the operating part moves is different from a direction in which the contact part moves,
   the tool body further comprises:
      a connector set part in which the concave part is formed;
      a base part to which the operating part approaches when the handle moves from the stand-by position to the push-into position; and
      a pair of support parts disposed between the connector set part and the base part and that supports the connecting shaft.

3. The manufacturing tool according to claim 1, wherein a projecting part projecting toward the contact part is disposed on an inner surface of the concave part.

4. The manufacturing tool according to claim 2, wherein a projecting part projecting toward the contact part is disposed on an inner surface of the concave part.

* * * * *